US012576915B2

(12) United States Patent
Kang et al.

(10) Patent No.: US 12,576,915 B2
(45) Date of Patent: Mar. 17, 2026

(54) STRUCTURE FOR PROTECTING BATTERY PACK OF VEHICLE

(71) Applicants: Hyundai Motor Company, Seoul (KR); Kia Corporation, Seoul (KR)

(72) Inventors: Seung Min Kang, Hwaseong-Si (KR); Joo Nam Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 393 days.

(21) Appl. No.: 18/195,788

(22) Filed: May 10, 2023

(65) Prior Publication Data

US 2024/0198777 A1     Jun. 20, 2024

(30) Foreign Application Priority Data

Dec. 15, 2022     (KR) ........................ 10-2022-0176027

(51) Int. Cl.
| | |
|---|---|
| *B60K 1/04* | (2019.01) |
| *B62D 21/15* | (2006.01) |
| *B62D 25/02* | (2006.01) |
| *B62D 25/20* | (2006.01) |
| *B62D 27/02* | (2006.01) |

(52) U.S. Cl.
CPC .............. *B62D 25/025* (2013.01); *B60K 1/04* (2013.01); *B62D 21/157* (2013.01); *B62D 25/2036* (2013.01); *B62D 27/02* (2013.01)

(58) Field of Classification Search
CPC .. B62D 25/025; B62D 25/2036; B62D 25/20; B62D 27/023; B62D 21/157

USPC .......... 296/209, 193.07, 204, 187.12, 29, 30
See application file for complete search history.

(56) References Cited

U.S. PATENT DOCUMENTS

| | | | |
|---|---|---|---|
| 11,235,811 B2 * | 2/2022 | Lee ...................... | B62D 27/026 |
| 12,286,004 B2 * | 4/2025 | Hiramatsu ............. | B62D 21/02 |
| 2016/0114667 A1 | 4/2016 | Ikeda et al. | |
| 2022/0041218 A1 | 2/2022 | Kang et al. | |

FOREIGN PATENT DOCUMENTS

| | | | |
|---|---|---|---|
| CN | 110329362 B | | 2/2021 |
| JP | H07-132860 | | 5/1995 |
| JP | H07-179185 | | 7/1995 |
| JP | 2016-164051 | | 9/2016 |
| JP | 7154704 B2 * | | 10/2022 |
| KR | 10-2019-0079777 | | 7/2019 |
| KR | 10-2022-0077634 | | 6/2022 |

OTHER PUBLICATIONS

JP7154704 Text (Year: 2022).*

* cited by examiner

*Primary Examiner* — Dennis H Pedder
(74) *Attorney, Agent, or Firm* — MORGAN, LEWIS & BOCKIUS LLP

(57)     ABSTRACT

A structure for protecting a battery pack of a vehicle, includes: a body cross member provided in a transverse direction of a vehicle body for connection between side sills provided at opposite sides of the vehicle body; a shock-absorbing member formed in backward and forward directions of the vehicle, provided inside the side sills, and aligned with the body cross member, and a battery side frame coupled to a lower side of the side sill and spaced from the shock-absorbing member.

20 Claims, 9 Drawing Sheets

3

19

21    5

11

17

STRUCTURE FOR PROTECTING BATTERY PACK OF VEHICLE

CROSS REFERENCE TO RELATED APPLICATION

The present application claims priority to Korean Patent Application No. 10-2022-0176027, filed Dec. 15, 2022, the entire contents of which is incorporated herein for all purposes by this reference.

BACKGROUND OF THE PRESENT DISCLOSURE

Field of the Present Disclosure

The present disclosure relates to technology for protecting a battery pack mounted to an electric vehicle or the like.

Description of Related Art

A hybrid electric vehicle, an electric vehicle, or the like is mounted with a battery pack to supply electric power to a motor that generates a driving force for the vehicle.

To increase the maximum distance the electric vehicle can go on one charge (hereinafter referred to as a 'cruising range'), the battery pack is gradually increased in size, and it is therefore becoming difficult to secure a space required in the vehicle to protect battery cells in the battery pack against a vehicle collision.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a structure for protecting a battery pack of a vehicle, in which batteries in the battery pack are more effectively protected when impact is applied to a lateral side of the vehicle mounted with the battery pack, and a certain level of vehicle lateral-impact resistance performance is easily ensured despite a change in specifications of the battery pack in terms of designing and producing various vehicles.

According to an exemplary embodiment of the present disclosure, a structure for protecting a battery pack of a vehicle includes: a body cross member provided in a transverse direction of a vehicle body for connection between side sills provided at opposite sides of the vehicle body; a shock-absorbing member formed long in backward and forward directions, provided inside the side sills, and aligned with the body cross member; and a battery side frame coupled to a lower side of each side sill and spaced from the shock-absorbing member.

The side sills may include a sill internal panel and a sill external panel, the body cross member and the shock-absorbing member may be respectively coupled to opposite sides of the sill internal panel while corresponding to each other, the battery side frame may be coupled to a lower side of the sill internal panel, and the sill external panel may be coupled to an external side of the sill internal panel to form a closed cross-section while surrounding the shock-absorbing member.

The shock-absorbing member may include a cross-sectional shape in which a plurality of closed cross-sections are overlapped along the transverse direction of the vehicle body, and may be coupled to the sill internal panel.

The structure may further include: an anti-rotation bracket supporting an upper surface of the shock-absorbing member in an upper side of each side sill; and an anti-rotation reinforcement member supporting a lower surface of the shock-absorbing member in a lower side of each side sill.

The anti-rotation bracket may include an upper vertical unit overlapped and coupled between the sill internal panel and the sill external panel, and a lower horizontal unit formed including an 'L'-shaped cross-section to be in surface-contact with the upper surface of the shock-absorbing member.

The anti-rotation reinforcement member may be formed long along a longitudinal direction of the vehicle body, and may include an upper horizontal unit coupled to be in surface-contact with the lower surface of the shock-absorbing member, and a lower vertical unit coupled to be in surface-contact with the sill internal panel.

The anti-rotation bracket may include a cross-sectional shape in which the vertical unit including a vertically long cross-section to be overlapped between the sill internal panel and the sill external panel and the horizontal unit including a horizontally long cross-section toward an outside of the vehicle body to be in surface-contact with the upper surface of the shock-absorbing member are connected to each other; and the anti-rotation reinforcement member may be formed long in the longitudinal direction of the vehicle body, and may include a cross-sectional shape in which the horizontal unit including a horizontally long cross-section toward the outside of the vehicle body to be in surface-contact with the lower surface of the shock-absorbing member and the vertical unit including a vertically long cross-section to be in surface-contact with the sill internal panel are connected to each other.

The structure may further include a battery mounting bracket provided in a lower portion of the sill internal panel to hold the battery side frame.

The battery mounting bracket may include an 'L'-shaped cross-section, and may include an upper vertical unit overlapped and coupled between the sill internal panel and the anti-rotation reinforcement member; and a lower horizontal unit provided integrally with a weld nut for fastening the battery side frame A body floor panel may be coupled to a lower side of the body cross member, and a portion in which the body floor panel and the sill internal panel are connected may be provided with a corner bracket that includes a horizontal unit coupled to a lower surface of the body floor panel and a vertical unit coupled to the sill internal panel.

The body floor panel may include opposite end portions bent upwards and coupled to be in surface-contact with the sill internal panel; and the corner bracket may include a slope between the vertical unit and the horizontal unit to form a closed cross-section together with the body floor panel and the sill internal panel.

The closed cross-section formed by the corner bracket may be horizontally aligned with the closed cross-sections of the shock-absorbing member.

A body floor panel may be coupled to a lower side of the body cross member, and a space formed by the body cross member and the body floor panel may be horizontally aligned with a plurality of closed cross-sections of the shock-absorbing member.

The body cross member may be coupled to a lower side of the body floor panel; and a space formed by the body cross member and the body floor panel may be horizontally aligned with a plurality of closed cross-sections of the shock-absorbing member.

The structure may further include connection brackets provided at opposite end portions of the body cross member and connecting the opposite end portions of the body cross member to the sill internal panels.

According to another exemplary embodiment of the present disclosure, a structure for protecting a battery pack of a vehicle includes: side sills formed including a closed cross-section formed by a sill internal panel and a sill external panel; a body floor panel provided for connection between the side sills provided at opposite sides of a vehicle body; a shock-absorbing member including a plurality of closed cross-sections overlapped in a transverse direction and provided inside the side sills; and a body cross member provided in the transverse direction of the vehicle body so that a space formed by the body cross member and the body floor panel may be horizontally aligned with the closed cross-section of the shock-absorbing member.

The body cross member may be provided to an upper side of the body floor panel, and an upper end portion of the body cross member may be horizontally aligned with an upper end portion of the shock-absorbing member.

The body cross member may be provided to a lower side of the body floor panel, and a lower end portion of the body cross member may be horizontally aligned with a lower end portion of the shock-absorbing member.

The side sills may include: an anti-rotation bracket supporting an upper surface of the shock-absorbing member not to rotate by impact from an outside; and an anti-rotation reinforcement member supporting a lower surface of the shock-absorbing member not to rotate by impact applied thereto from the outside.

A battery side frame may be coupled to a lower side of the sill internal panel and spaced from the shock-absorbing member to form a battery casing; and the side sills may be internally provided with a battery mounting bracket including a weld nut for fastening the battery side frame.

According to an exemplary embodiment of the present disclosure, batteries in a battery pack are more effectively protected when impact is applied to a lateral side of a vehicle mounted with the battery pack, and a predetermined level of vehicle lateral-impact resistance performance is easily ensured despite change in specifications of the battery pack in terms of designing and producing various vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
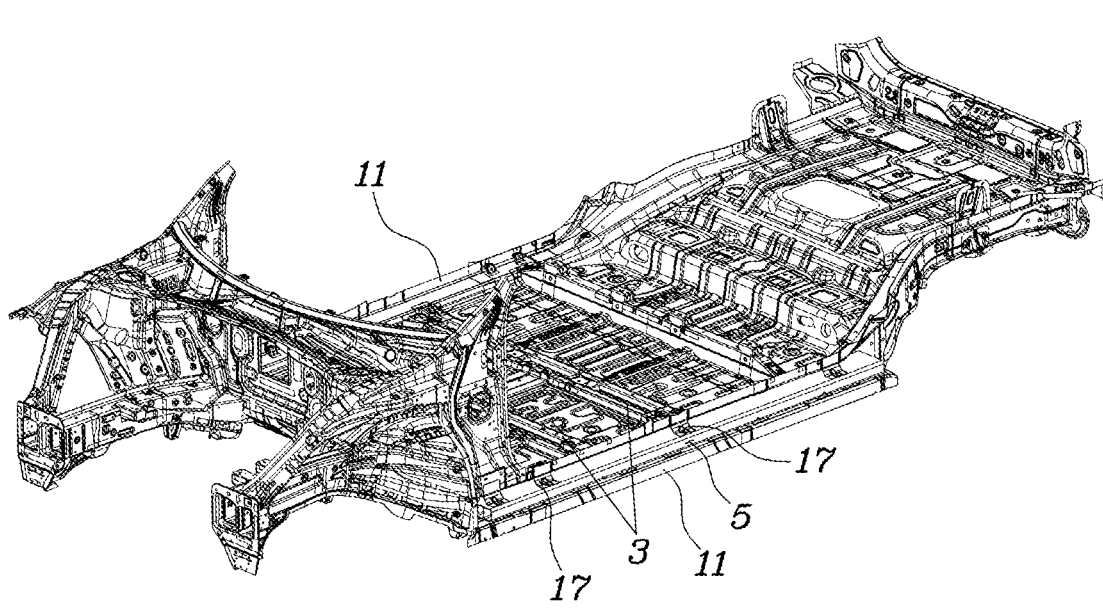
FIG. 1 is a view exemplarily illustrating a part of a vehicle body according to an exemplary embodiment of the present disclosure.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings, in which the same or similar components are denoted by the same reference numerals even though they are depicted in different drawings and redundant descriptions thereof will be avoided.

Suffixes "module" and "unit" put after components in the following description are provided in consideration of only ease of description and do not have meaning or functions discriminated from each other.

In terms of describing the exemplary embodiments of the present disclosure, detailed descriptions of related art will be omitted when they may make the subject matter of the exemplary embodiments of the present disclosure rather unclear. Furthermore, the accompanying drawings are provided only for a better understanding of the exemplary embodiments of the present disclosure and are not intended to limit technical ideas of the present disclosure. Therefore, it should be understood that the accompanying drawings include all modifications, equivalents and substitutions within the scope and spirit of the present disclosure.

Terms such as "first" and "second" may be used to describe various components, but the components should not be limited by the above terms. Furthermore, the above terms are used only for distinguishing one component from another.

When it is described that one component is "connected" or "joined" to another component, it should be understood that the one component may be directly connected or joined to another component, but additional components may be present therebetween. However, when one component is referred to as being "directly connected," or "directly coupled" to another component, it should be understood that additional components may be absent between the one component and another component.

Unless the context clearly dictates otherwise, singular forms include plural forms as well.

In an exemplary embodiment of the present disclosure, it should be understood that term "include" or "have" indicates that a feature, a number, a step, an operation, a component, a part, or the combination thereof described in the exemplary embodiments is present, but does not preclude a possibility of presence or addition of one or more other features, numbers, steps, operations, components, parts or combinations thereof, in advance.

Figure 2:
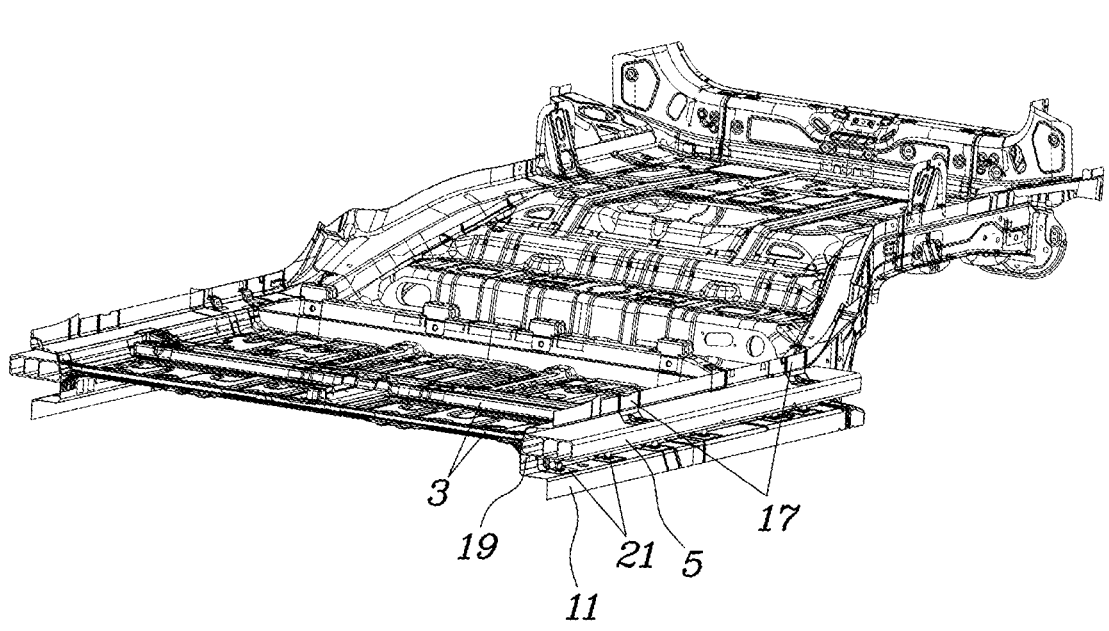
FIG. 2 is a view showing a state that the part of FIG. 1 is cut.
Figure 3:
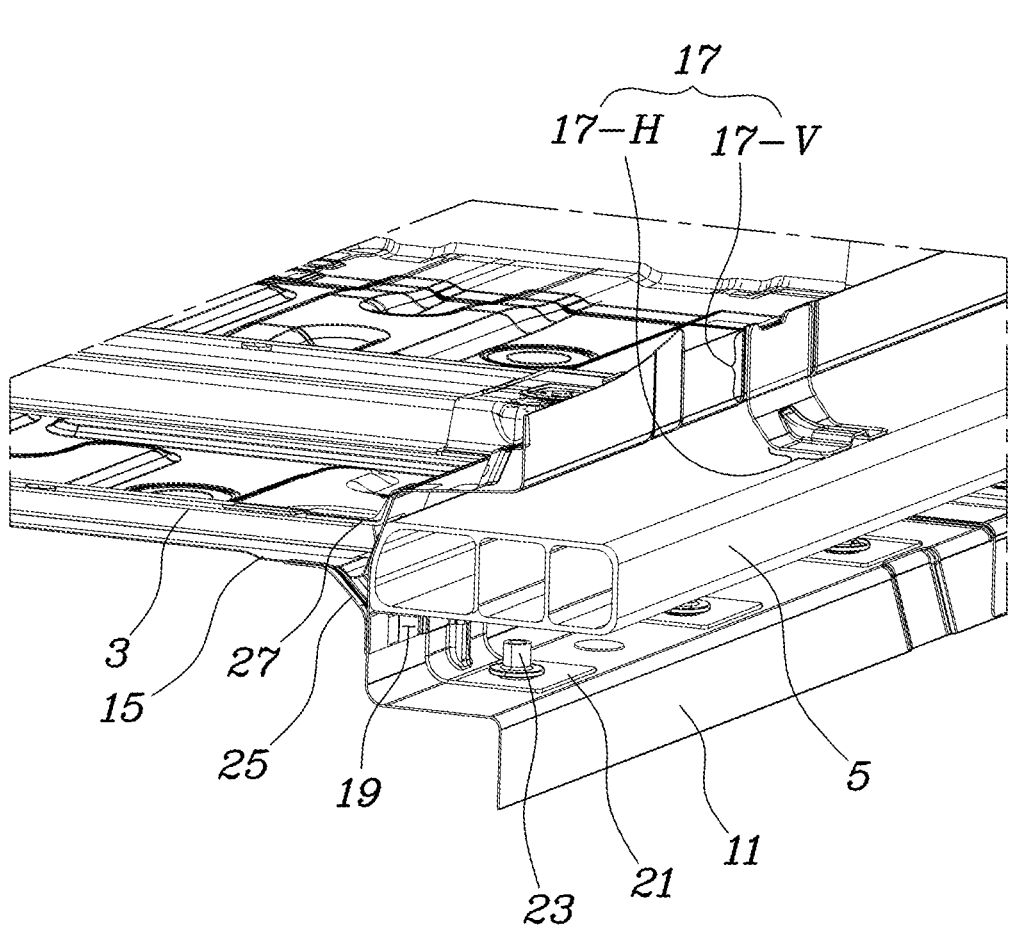
FIG. 3 is a detailed view of a major part in FIG. 2, FIG. 4 and FIG. 5 are views of the part of FIG. 3 observed at different angles.

FIG. 1 is a view exemplarily illustrating a part of a vehicle body according to an exemplary embodiment of the present disclosure, FIG. 2 is a view showing a state that the part of FIG. 1 is cut, and FIG. 3 is a detailed view of a major part in FIG. 2.

Figure 4:
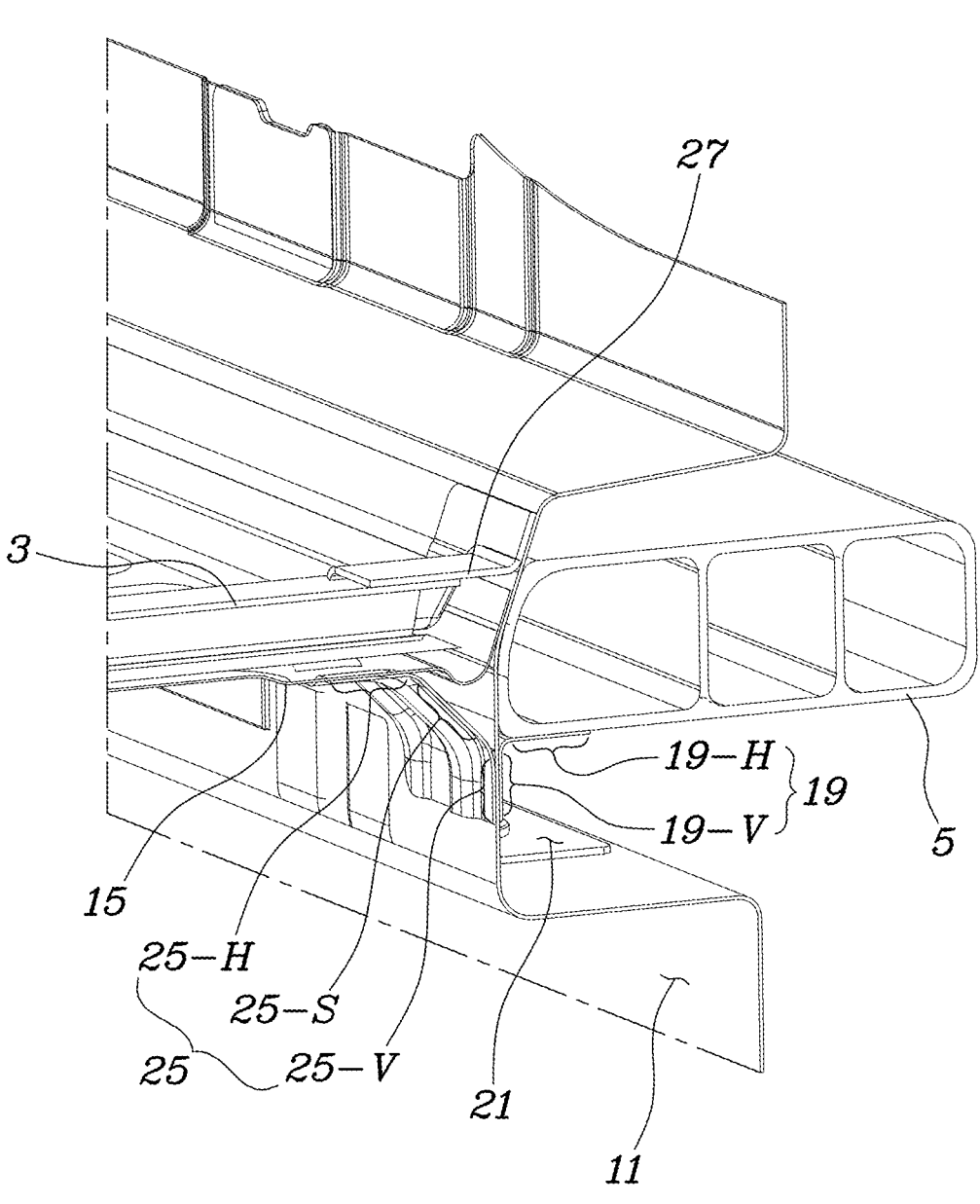
Figure 5:
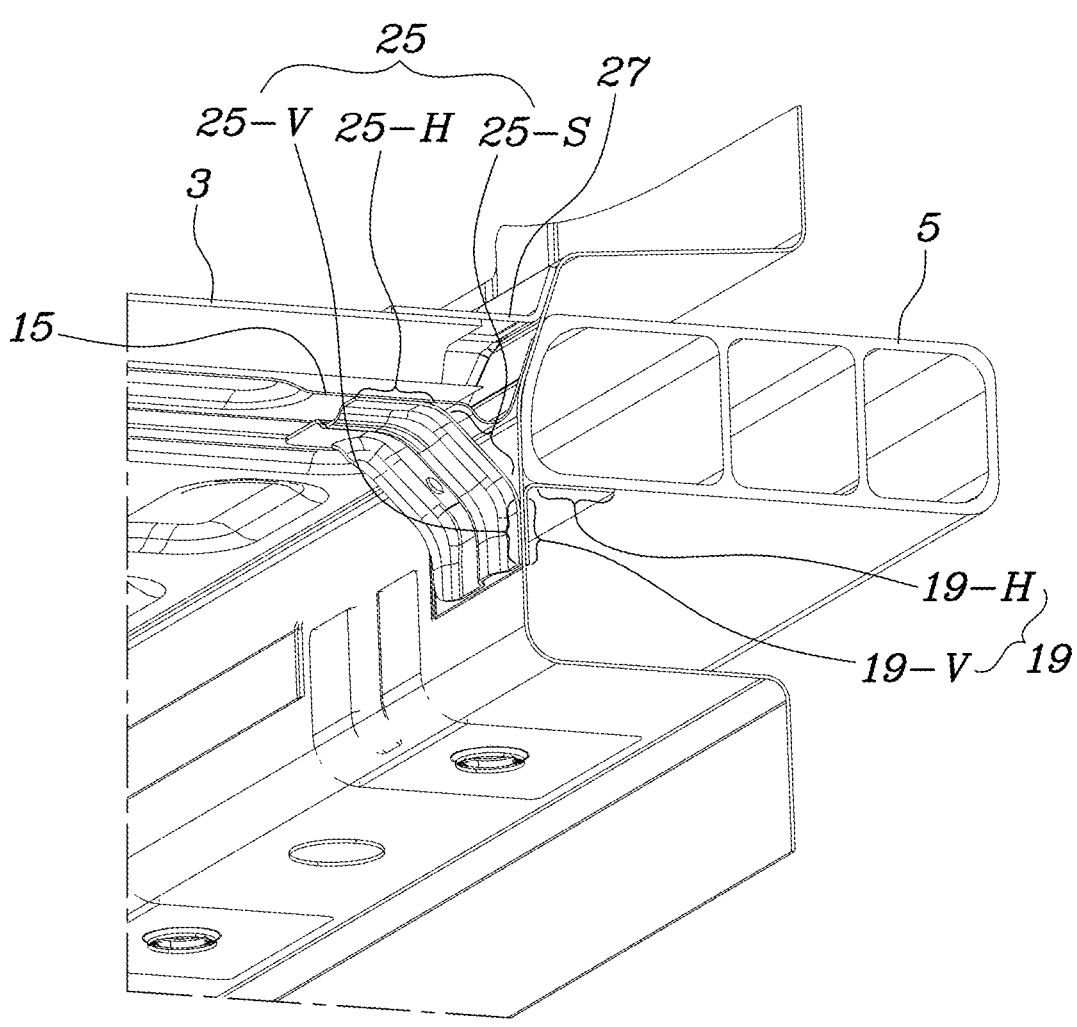
Figure 6:
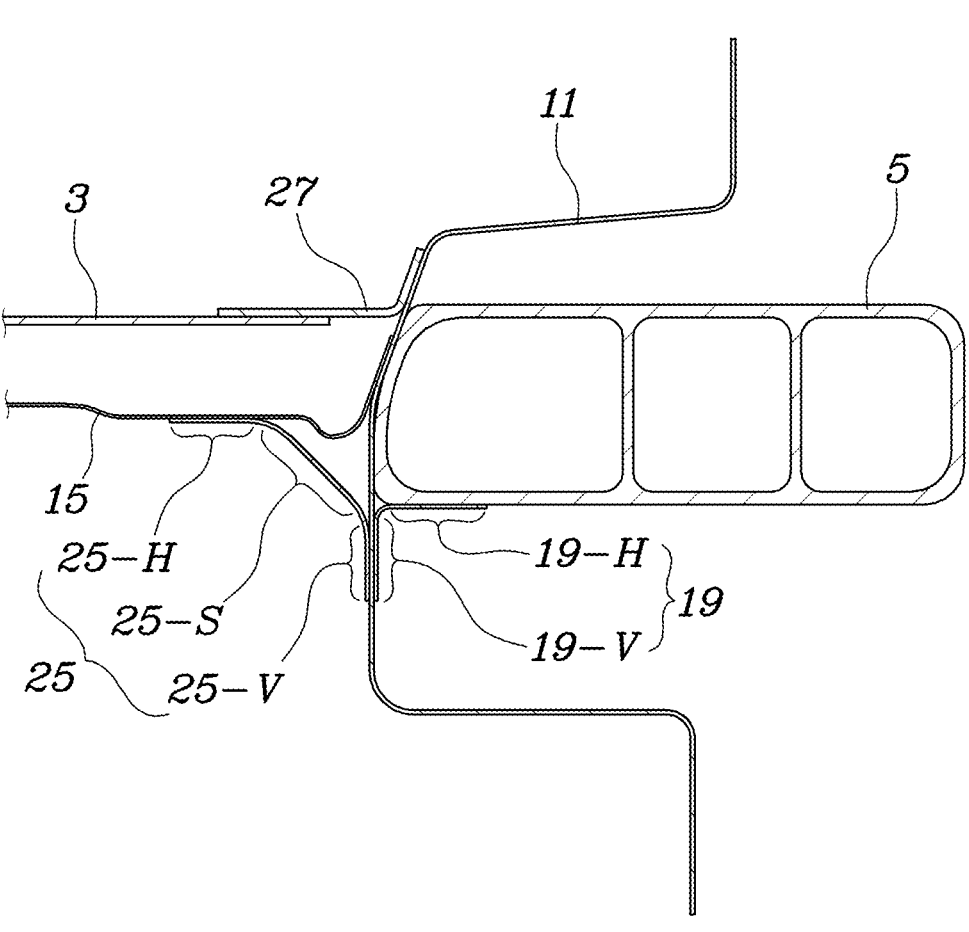
FIG. 6 is a planar view of the cross section of FIG. 3.

FIG. 4 and FIG. 5 are views of the part of FIG. 3 observed at different angles, and FIG. 6 is a planar view of the cross section of FIG. 3.

Figure 7:
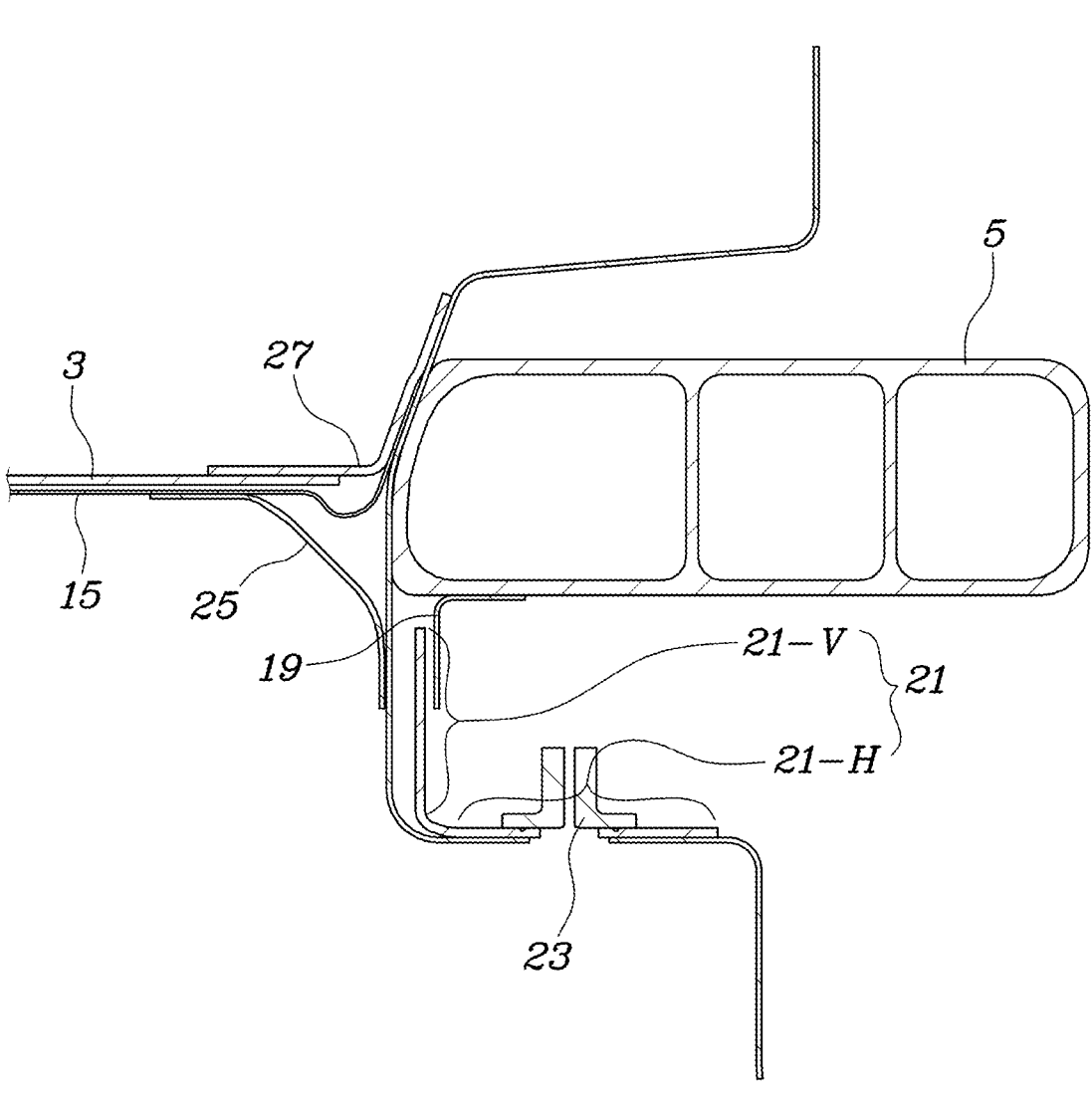
FIG. 7 is a cross-sectional view of a portion to which a battery mounting bracket is mounted according to an exemplary embodiment of the present disclosure.

FIG. 7 is a cross-sectional view of a portion to which a battery mounting bracket is mounted according to an exemplary embodiment of the present disclosure, which shows a cross-section parallel with the cross-section of FIG. 6.

Figure 8:
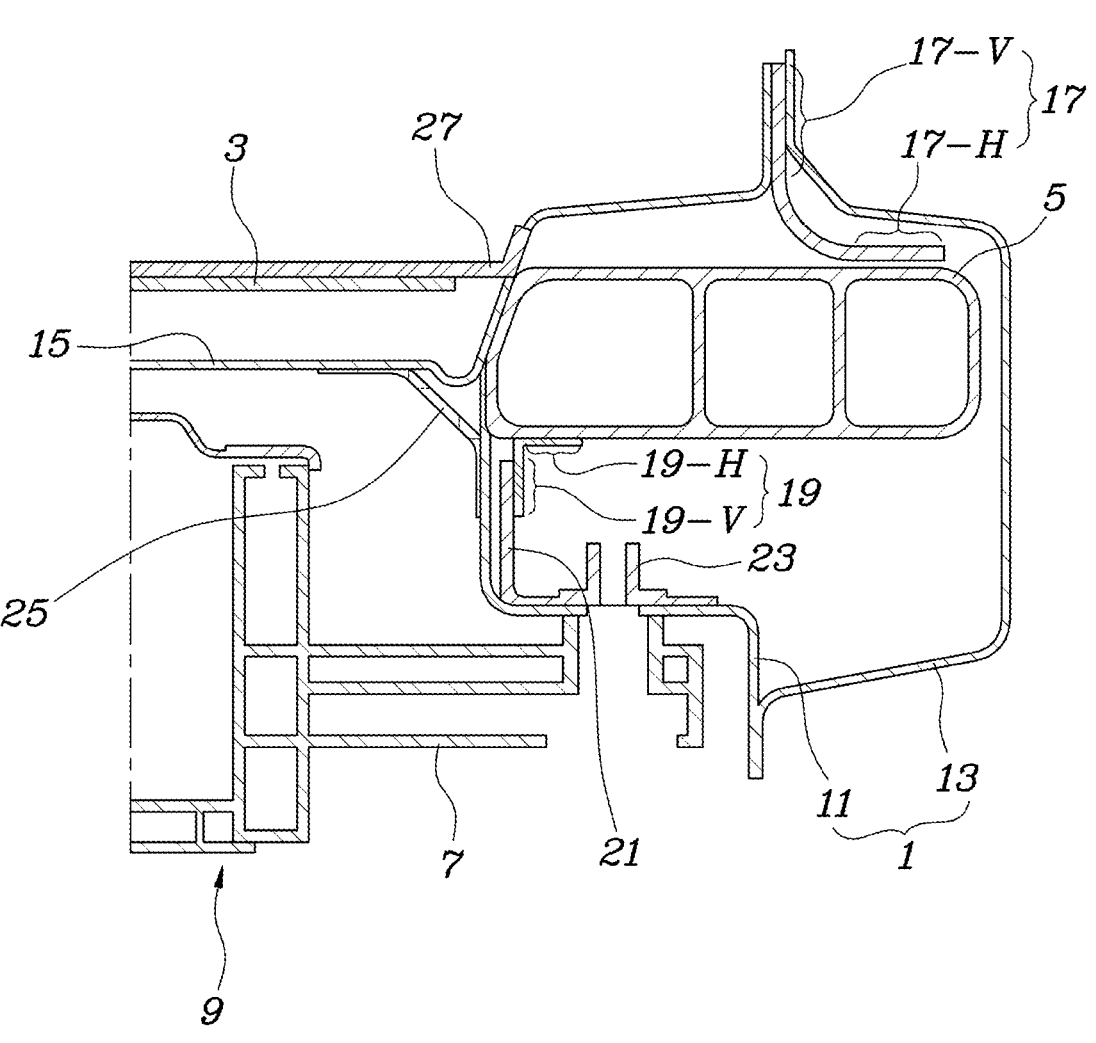
FIG. 8 is a cross-sectional view for describing concept of coupling a battery side frame according to an exemplary embodiment of the present disclosure.

FIG. 8 describes concept that the cross-section of FIG. 6 and the cross-section of FIG. 7 are conceptually merged into one and a battery side frame is coupled thereto, and illustrates a side sill together with a sill external panel which is omitted in FIGS. 1 to 7.

Figure 9:
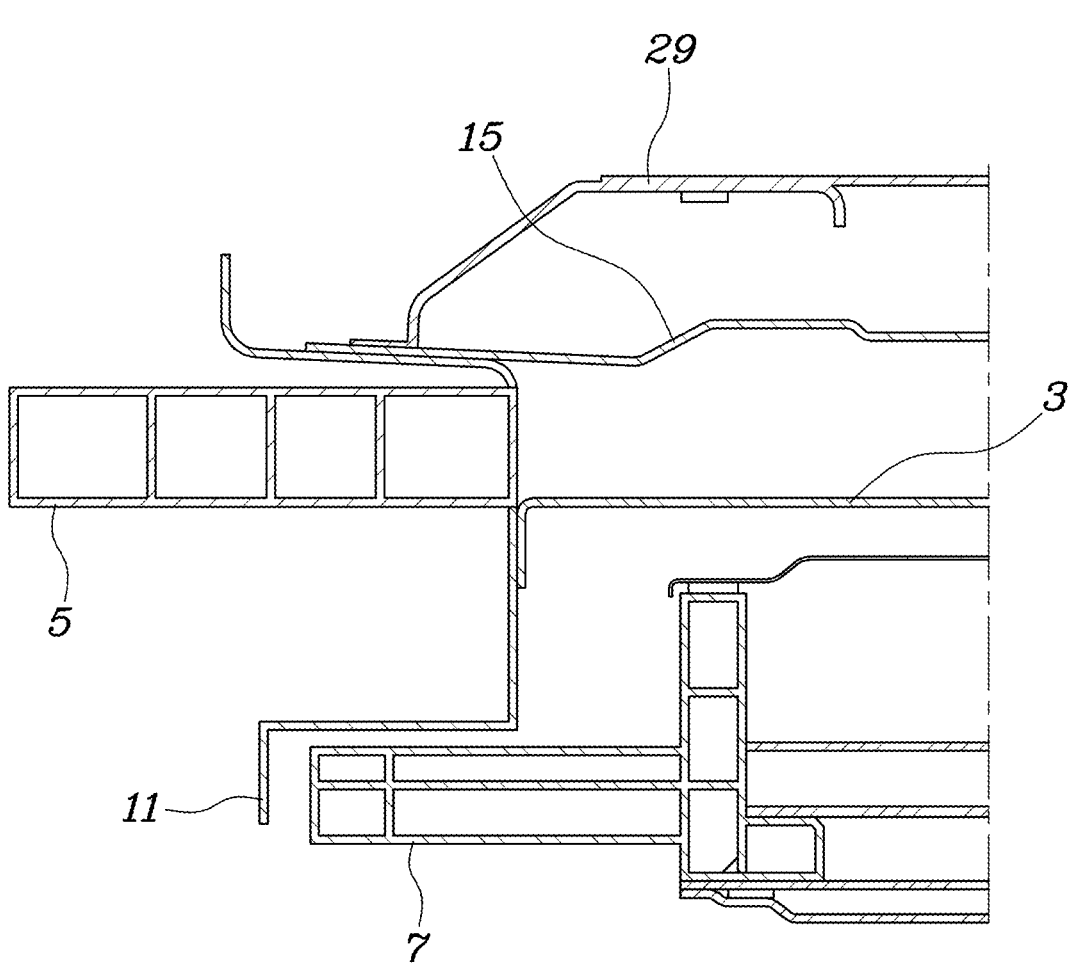
FIG. 9 is a cross-sectional view exemplarily illustrating another exemplary embodiment of the present disclosure.

FIG. 9 illustrates another exemplary embodiment of the present disclosure, in which a shock-absorbing member is aligned with a body cross member when the body cross member is provided at a lower side of a body floor panel, as compared with the exemplary embodiment of FIG. 1, FIG. 2, FIG. 3, FIG. 4, FIG. 5, FIG. 6, FIG. 7, and FIG. 8.

Referring to FIG. 1, FIG. 2, FIG. 3, FIG. 4, FIG. 5, FIG. 6, FIG. 7, and FIG. 8, a structure for protecting a battery pack of a vehicle according to an exemplary embodiment of the present disclosure includes a body cross member 3 provided long in a transverse direction of a vehicle body to connect side sills 1 provided at the opposite sides of the vehicle body; a shock-absorbing member 5 formed long in backward and forward directions of the vehicle and provided inside the side sill 1 to be aligned with the body cross member 3; and a battery side frame 7 coupled to the lower side of the side sill 1 and spaced from the shock-absorbing member 5.

In other words, according to an exemplary embodiment of the present disclosure, the shock-absorbing member 5 is provided inside the side sill 1 and the body cross member 3 is aligned with the shock-absorbing member 5, so that the body cross member 3 can support impact received through the shock-absorbing member 5 when the impact is applied thereto from the outside of the side sill 1, allowing the shock-absorbing member 5 and the body cross member 3 to mainly support the impact applied from a lateral side of the vehicle body.

Of course, the impact applied to the lateral side of the vehicle body may be transmitted even to the battery side frame 7, and in the instant case, the battery side frame 7 may also be deformed to absorb shock. However, the battery side frame 7 and the shock-absorbing member 5 are vertically spaced from each other as described above, and therefore the impact is not directly transmitted from the shock-absorbing member 5 to the battery side frame 7. Accordingly, even though the battery pack 9 mounted to the vehicle is changed in size, weight, etc. according to various structures and specifications, the vehicle body's performance of supporting lateral collisions is always provided to a certain level or higher regardless of such changes.

The side sill 1 includes a sill internal panel 11; and a sill external panel 13, in which the body cross member 3 and the shock-absorbing member 5 are respectively coupled to the opposite sides of the sill internal panel 11 while being disposed at the same height as each other, and the battery side frame 7 is coupled to the lower side of the sill internal panel, and the sill external panel 13 is coupled to the external side of the sill internal panel 11 to form a closed cross-section while surrounding the shock-absorbing member 5.

The shock-absorbing member 5 includes a cross-sectional shape in which a plurality of closed cross-sections are overlapped along the transverse direction of the vehicle body, and is coupled to the sill internal panel 11.

A body floor panel 15 is coupled to a lower side of the body cross member 3; and a space formed between the body cross member 3 and the body floor panel 15 is horizontally aligned with the plurality of closed cross-sections of the shock-absorbing member 5.

Therefore, regarding the impact applied from the lateral side of the vehicle, the shock-absorbing member 5 absorbs shock while the plurality of closed cross-sections collapse.

Meanwhile, the side sill 1 is internally provided with an anti-rotation bracket 17 supporting an upper surface of the shock-absorbing member 5 in an upper side of the side sill 1; and an anti-rotation reinforcement member 19 supporting a lower surface of the shock-absorbing member 5 in a lower side of the side sill 1.

The anti-rotation bracket 17 includes an upper vertical unit 17-V overlapped and coupled between the sill internal panel 11 and the sill external panel 13, and a lower horizontal unit 17-H formed including an 'L'-shaped cross-section to be in surface-contact with the upper surface of the shock-absorbing member 5.

Furthermore, the anti-rotation reinforcement member 19 is formed long in the longitudinal direction of the vehicle body, and includes an upper horizontal unit 19-H coupled to be in surface-contact with the lower surface of the shock-absorbing member 5, and a lower vertical unit 19-V coupled to be in surface-contact with the sill internal panel 11.

In other words, the anti-rotation bracket 17 includes a cross-sectional shape in which the vertical unit 17-V including a vertically long cross-section to be overlapped between the sill internal panel 11 and the sill external panel 13 and the horizontal unit 17-H including a horizontally long cross-section toward the outside of the vehicle body to be in surface-contact with the upper surface of the shock-absorbing member 5 are connected to each other.

The anti-rotation reinforcement member 19 is formed long in the longitudinal direction of the vehicle body, and includes a cross-sectional shape in which the horizontal unit 19-H including a horizontally long cross-section toward the outside of the vehicle body to be in surface-contact with the lower surface of the shock-absorbing member 5 and the vertical unit 19-V including a vertically long cross-section to be in surface-contact with the sill internal panel 11 are connected to each other.

Therefore, when the shock-absorbing member 5 is deformed to absorb shock on impact applied from the lateral side of the vehicle body, the shock-absorbing member 5 fully absorbs shock on the impact without rotating upwards or downwards inside the side sill 1, and prevents the impact from being transmitted to the lower battery side frame 7 and the like if possible, more safely protecting the battery cells of the battery pack 9.

A battery mounting bracket 21 is provided in a lower portion of the sill internal panel 11 to hold the battery side frame 7.

The battery mounting bracket 21 includes an 'L'-shaped cross-section, and includes an upper vertical unit 21-V overlapped and coupled between the sill internal panel 11 and the anti-rotation reinforcement member 19; and a lower horizontal unit 21-H provided integrally with a weld nut 23 for fastening the battery side frame 7.

Therefore, as shown in FIG. 8, when a bolt or the like is fastened to the weld nut 23 of the battery mounting bracket 21 while passing through the battery side frame 7 from below in a state that the battery side frame 7 is aligned with the bottom portion of the side sill 1, the battery pack 9 is securely supported on the bottom portion of the side sill 1.

As described above, the body floor panel 15 is coupled to the lower side of the body cross member 3, and a portion where the body floor panel 15 and the sill internal panel 11 are connected is provided with a corner bracket 25 that includes a horizontal unit 25-H coupled to a lower surface of the body floor panel 15 and a vertical unit 25-V coupled to the sill internal panel 11.

The lateral end portions of the body floor panel 15 are bent upwards and coupled to be in surface-contact with the sill internal panel 11; and the corner bracket 25 includes a slope 25-S formed between the vertical unit 25-V and the horizontal unit 25-H to form a closed cross-section together with the body floor panel 15 and the sill internal panel 11.

The closed cross-section formed by the corner bracket 25 is horizontally aligned with the closed cross-sections of the shock-absorbing member 5.

Therefore, even the body floor panel 15 and the corner bracket 25 securely support the impact transmitted from the outside thereof through the shock-absorbing member 5.

Meanwhile, connection brackets 27 are provided at both end portions of the body cross member 3 and connects both end portions of the body cross member 3 to the sill internal panels 11.

The connection brackets 27 ensure the connection between both end portions of the body cross member 3 and the side sills 1, so that the body cross member 3 can securely support the internal side of the vehicle body of the side sill 1, making the body cross member 3 securely support the impact transmitted through the shock-absorbing member 5.

Meanwhile, the body cross member 3 is fastened with a battery through bolt through the battery pack 9 and the body floor panel 15, allowing the body cross member 3 to provide firmer support without being easily buckled or deformed by the impact transmitted from the lateral side through the shock-absorbing member 5.

Meanwhile, FIG. 9 illustrates another exemplary embodiment of the present disclosure, in which the body cross member 3 is coupled to the lower side of the body floor panel 15; and a space formed by the body cross member 3 and the body floor panel 15 is horizontally aligned with the plurality of closed cross-sections of the shock-absorbing member 5.

For reference, FIG. 9 shows a seat cross member 29 provided above the body floor panel 15 and used in mounting a seat and shows only the sill internal panel 11 of the side sill.

The foregoing embodiment may be expressed as follows.

In other words, a structure for protecting a battery pack of a vehicle according to various exemplary embodiments of the present disclosure may include a side sill 1 formed including a closed cross-section formed by a sill internal panel 11 and a sill external panel 13; a body floor panel 15 provided for connection between the side sills 1 provided at opposite sides of a vehicle body; a shock-absorbing member 5 including a plurality of closed cross-sections overlapped in a transverse direction and provided inside the side sill 1; and a body cross member 3 provided in the transverse direction of the vehicle body so that a space formed by the body cross member 3 and the body floor panel 15 may be horizontally aligned with the closed cross-section of the shock-absorbing member 5.

In the exemplary embodiment of FIG. 1, FIG. 2, FIG. 3, FIG. 4, FIG. 5, FIG. 6, FIG. 7, and FIG. 8, the body cross member 3 is provided to the upper side of the body floor panel 15; and the upper end portion of the body cross member 3 is horizontally aligned with the upper end portion of the shock-absorbing member 5.

In the exemplary embodiment of FIG. 9, the body cross member 3 is provided to the lower side of the body floor panel 15; and the lower end portion of the body cross member 3 is horizontally aligned with the lower end portion of the shock-absorbing member 5.

Ultimately, in the foregoing two embodiments, the space formed by the body cross member 3 and the body floor panel 15 is horizontally aligned with the closed cross-sections of the shock-absorbing member 5, allowing the body cross member 3 and the body floor panel 15 to support the impact transmitted from the outside thereof through the shock-absorbing member 5.

The side sill 1 is internally provided with an anti-rotation bracket 17 supporting the upper surface of the shock-absorbing member 5 not to rotate by impact from the outside thereof, and an anti-rotation reinforcement member 19 supporting the lower surface of the shock-absorbing member 5 not to rotate by impact applied thereto from the outside.

A battery side frame 7 is coupled to the lower side of the sill internal panel 11 and spaced from the shock-absorbing member 5 to form a battery casing; and the side sill 1 is internally provided with a battery mounting bracket 21 including a weld nut 23 for fastening the battery side frame 7.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A structure for protecting a battery pack of a vehicle, the structure comprising:

a body cross member provided in a transverse direction of a vehicle body for connection between side sills provided at opposite sides of the vehicle body;

a shock-absorbing member formed in backward and forward directions of the vehicle, placed inside the side sills, and aligned with the body cross member; and a battery side frame coupled to a lower side of each side sill and spaced from the shock-absorbing member, wherein each side sill includes a sill internal panel and a sill external panel, wherein the body cross member and the shock-absorbing member are respectively directly coupled to opposite sides of the sill internal panel while being disposed at a same height as each other, and wherein the shock-absorbing member is positioned above the battery side frame.

2. The structure of claim 1, wherein the battery side frame is coupled to a lower side of the sill internal panel, and wherein the sill external panel is coupled to an external side of the sill internal panel to form a closed cross-section while surrounding the shock-absorbing member.

3. The structure of claim 2, wherein the shock-absorbing member includes a cross-sectional shape in which a plurality of closed cross-sections are overlapped along the transverse direction of the vehicle body, and is coupled to the sill internal panel.

4. The structure of claim 3, further including:

an anti-rotation bracket supporting an upper surface of the shock-absorbing member in an upper side of each side sill; and an anti-rotation reinforcement member supporting a lower surface of the shock-absorbing member in a lower side of each side sill.

5. The structure of claim 4, wherein the anti-rotation bracket includes:

an upper vertical unit overlapped and coupled between the sill internal panel and the sill external panel; and a lower horizontal unit formed including an 'L'-shaped cross-section to be in surface-contact with the upper surface of the shock-absorbing member.

6. The structure of claim 4, wherein the anti-rotation reinforcement member is formed along a longitudinal direction of the vehicle body, and includes:

an upper horizontal unit coupled to be in surface-contact with the lower surface of the shock-absorbing member; and a lower vertical unit coupled to be in surface-contact with the sill internal panel.

7. The structure of claim 4, wherein the anti-rotation bracket includes a cross-sectional shape in which a vertical unit including a vertically extending cross-section to be overlapped between the sill internal panel and the sill external panel and a horizontal unit including a horizontally long cross-section toward an outside of the vehicle body to be in surface-contact with the upper surface of the shock-absorbing member are connected to each other, and wherein the anti-rotation reinforcement member is formed to extend in the longitudinal direction of the vehicle body, and includes a cross-sectional shape in which a horizontal unit including a horizontally extending cross-section toward the outside of the vehicle body to be in surface-contact with the lower surface of the shock-absorbing member and a vertical unit including a vertically extending cross-section to be in surface-contact with the sill internal panel are connected to each other.

8. The structure of claim 4, further including a battery mounting bracket provided in a lower portion of the sill internal panel to hold the battery side frame.

9. The structure of claim 8, wherein the battery mounting bracket includes an 'L'-shaped cross-section, and includes:

an upper vertical unit overlapped and coupled between the sill internal panel and the anti-rotation reinforcement member; and a lower horizontal unit provided integrally with a weld nut for fastening the battery side frame.

10. The structure of claim 4, wherein a body floor panel is coupled to a lower side of the body cross member, and wherein a portion in which the body floor panel and the sill internal panel are connected is provided with a corner bracket that includes a horizontal unit coupled to a lower surface of the body floor panel and a vertical unit coupled to the sill internal panel.

11. The structure of claim 10, wherein the body floor panel includes opposite end portions bent upwards and coupled to be in surface-contact with the sill internal panel, and wherein the corner bracket includes a slope between the vertical unit and the horizontal unit to form a closed cross-section together with the body floor panel and the sill internal panel.

12. The structure of claim 11, wherein the closed cross-section formed by the corner bracket is horizontally aligned with the closed cross-sections of the shock-absorbing member.

13. The structure of claim 3, wherein a body floor panel is coupled to a lower side of the body cross member, and wherein a space formed by the body cross member and the body floor panel are connected is horizontally aligned with the plurality of closed cross-sections of the shock-absorbing member.

14. The structure of claim 3, wherein the body cross member is coupled to a lower side of a body floor panel, and wherein a space formed by the body cross member and the body floor panel is horizontally aligned with the plurality of closed cross-sections of the shock-absorbing member.

15. The structure of claim 2, further including connection brackets provided at opposite end portions of the body cross member and connecting the opposite end portions of the body cross member to the sill internal panels.

16. A structure for protecting a battery pack of a vehicle, the structure comprising:

side sills formed, each of which includes a closed cross-section formed by a sill internal panel and a sill external panel;

a body floor panel provided for connection between the side sills provided at opposite sides of a vehicle body;

a shock-absorbing member including a plurality of closed cross-sections overlapped in a transverse direction and placed inside the side sills; and a body cross member provided in the transverse direction of the vehicle body so that a space formed by the body cross member and the body floor panel is horizontally aligned with the closed cross-sections of the shock-absorbing member, wherein the body cross member and the shock-absorbing member are respectively directly coupled to opposite sides of the sill internal panel while being disposed at a same height as each other.

17. The structure of claim 16, wherein the body cross member is provided to an upper side of the body floor panel, and wherein an upper end portion of the body cross member is horizontally aligned with an upper end portion of the shock-absorbing member.

18. The structure of claim 16, wherein the body cross member is provided to a lower side of the body floor panel, and wherein a lower end portion of the body cross member is horizontally aligned with a lower end portion of the shock-absorbing member.

19. The structure of claim 16, wherein each side sill includes:

an anti-rotation bracket supporting an upper surface of the shock-absorbing member not to rotate by impact applied thereto from an outside thereof; and an anti-rotation reinforcement member supporting a lower surface of the shock-absorbing member not to rotate by impact applied thereto from the outside.

20. The structure of claim 16, wherein a battery side frame is coupled to a lower side of the sill internal panel and spaced from the shock-absorbing member to form a battery casing, and wherein each side sill is internally provided with a battery mounting bracket including a weld nut for fastening the battery side frame.

\* \* \* \* \*